(12) United States Patent  
Hiranishi et al.

(10) Patent No.: US 10,074,880 B2  
(45) Date of Patent: Sep. 11, 2018

(54) COOLING STRUCTURE OF ELECTRICITY STORAGE DEVICE

(71) Applicant: HONDA MOTOR CO., LTD., Tokyo (JP)

(72) Inventors: Toru Hiranishi, Wako (JP); Koichi Takahashi, Wako (JP); Tetsu Miyamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 55 days.

(21) Appl. No.: 14/157,523

(22) Filed: Jan. 17, 2014

(65) Prior Publication Data

US 2014/0212721 A1 Jul. 31, 2014

(30) Foreign Application Priority Data

Jan. 31, 2013 (JP) .................................. 2013-017274

(51) Int. Cl.
*H01M 10/50* (2006.01)
*H01M 10/613* (2014.01)
(Continued)

(52) U.S. Cl.
CPC ..... *H01M 10/5004* (2013.01); *H01M 2/1077* (2013.01); *H01M 10/613* (2015.04);
(Continued)

(58) Field of Classification Search
CPC .. H01M 6/5038; H01M 10/60; H01M 10/613; H01M 10/1076; H01M 10/625;
(Continued)

(56) References Cited

U.S. PATENT DOCUMENTS

2008/0187820 A1* 8/2008 Nakano ..................... H01G 2/08
429/83
2008/0318113 A1* 12/2008 Wang ................ H01M 8/04089
429/439

(Continued)

FOREIGN PATENT DOCUMENTS

CN 101960663 1/2011
JP 2003-112531 4/2003

(Continued)

OTHER PUBLICATIONS

Machine Translation: JP 2006-216505.*

(Continued)

*Primary Examiner* — Stephen J Yanchuk
(74) *Attorney, Agent, or Firm* — Mori & Ward, LLP

(57) ABSTRACT

A cooling structure of an electricity storage device includes a storage cell case, a plurality of storage cells, a plurality of cooling passages, an intake duct, an exhaust duct, a cooling air suction device, and a flow path resistance. The plurality of storage cells are accommodated in the storage cell case. The plurality of cooling passages are provided between the storage cells. The intake duct is connected to an upstream side of the storage cell case. The exhaust duct is connected to a downstream side of the storage cell case. The cooling air suction device is connected to the exhaust duct and configured to draw cooling air from the intake duct. The flow path resistance is provided between the plurality of cooling passages and the cooling air suction device to limit a flow of the cooling air from the intake duct to the cooling air suction device.

25 Claims, 6 Drawing Sheets

(51) Int. Cl.
  *H01M 2/10* (2006.01)
  *H01M 10/625* (2014.01)
  *H01M 10/6563* (2014.01)
  *H01M 10/647* (2014.01)
  *H01M 10/6557* (2014.01)
  *H01M 10/663* (2014.01)

(52) U.S. Cl.
  CPC ....... *H01M 10/625* (2015.04); *H01M 10/647* (2015.04); *H01M 10/6557* (2015.04); *H01M 10/6563* (2015.04); *B60L 2240/545* (2013.01); *H01M 10/663* (2015.04)

(58) Field of Classification Search
  CPC ........... H01M 10/647; H01M 10/6557; H01M 10/6563; H01M 10/652; H01M 10/617; H01M 10/6566; H01M 10/6556
  See application file for complete search history.

(56) References Cited

U.S. PATENT DOCUMENTS

| | | | | |
|---|---|---|---|---|
| 2010/0294580 | A1* | 11/2010 | Kubota | B60K 1/04 180/68.1 |
| 2011/0104547 | A1* | 5/2011 | Saito | H01M 2/1077 429/120 |
| 2013/0316211 | A1* | 11/2013 | Kim | H01M 2/1077 429/99 |
| 2014/0014421 | A1* | 1/2014 | Carpenter | H01M 10/5006 180/65.1 |
| 2015/0060164 | A1* | 3/2015 | Wang | B60K 6/405 180/65.21 |

FOREIGN PATENT DOCUMENTS

| | | |
|---|---|---|
| JP | 2006-216505 | 8/2006 |
| JP | 2007-123147 | 5/2007 |
| JP | 2007-172937 | 7/2007 |
| JP | 2007-299637 | 11/2007 |
| JP | 2011-515798 | 5/2011 |
| JP | 2012-150977 | 8/2012 |
| WO | WO 2009/098953 | 8/2009 |
| WO | WO 2010/032313 | 3/2010 |

OTHER PUBLICATIONS

Chinese Office Action for corresponding CN Application No. 201410041502.9, dated Apr. 1, 2016.

Japanese Office Action for corresponding JP Application No. 2013-017274, dated Nov. 30, 2016.

Japanese Office Action for corresponding JP Application No. 2013-017274, dated Sep. 7, 2016.

* cited by examiner

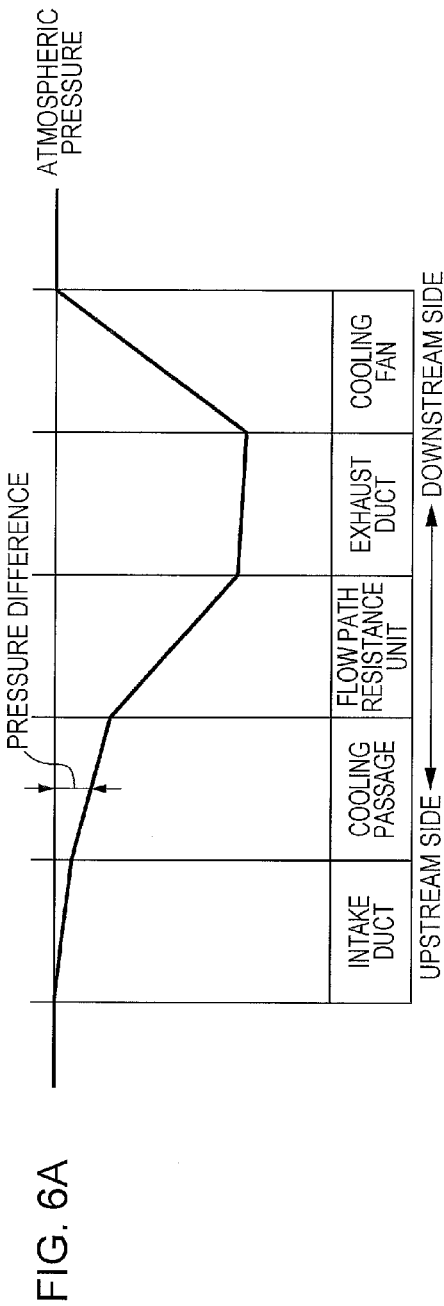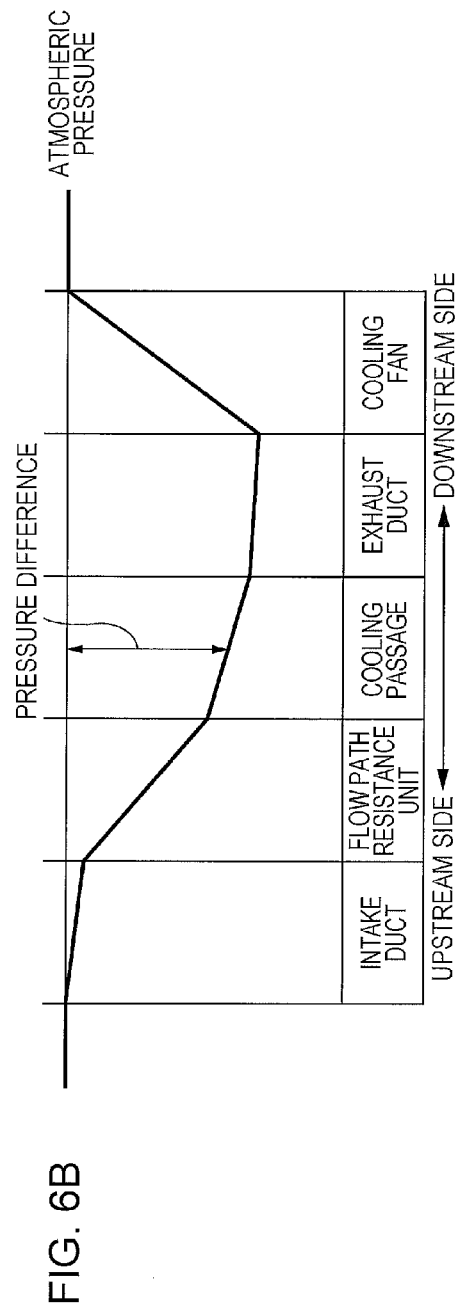

COOLING STRUCTURE OF ELECTRICITY STORAGE DEVICE

CROSS-REFERENCE TO RELATED APPLICATIONS

The present application claims priority under 35 U.S.C. § 119 to Japanese Patent Application No. 2013-017274, filed Jan. 31, 2013, entitled "Cooling Structure of Electricity Storage Device." The contents of this application are incorporated herein by reference in their entirety.

BACKGROUND

1. Field

The present disclosure relates to a cooling structure of an electricity storage device.

2. Description of the Related Art

A power source device in which an inflow duct and an exhaust duct are respectively provided on an upstream side and a downstream side of a battery case in which a plurality of batteries are to be accommodated, in which an air-blowing fan that is connected to a downstream side of the exhaust duct causes cooling air to be drawn into the battery case from the inflow duct, and in which cooling air that has cooled the plurality of batteries is discharged through the exhaust duct is publicly known by Japanese Unexamined Patent Application Publication No. 2007-123147.

SUMMARY

According to one aspect of the present invention, a cooling structure of an electricity storage device includes a storage cell case, a plurality of storage cells, a plurality of cooling passages, an intake duct, an exhaust duct, a cooling air suction device, and a flow path resistance. The plurality of storage cells are accommodated in the storage cell case. The plurality of cooling passages are provided between the storage cells. The intake duct is connected to an upstream side of the storage cell case. The exhaust duct is connected to a downstream side of the storage cell case. The cooling air suction device is connected to the exhaust duct and configured to draw cooling air from the intake duct. The flow path resistance is provided between the plurality of cooling passages and the cooling air suction device to limit a flow of the cooling air from the intake duct to the cooling air suction device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 6A and 6B are diagrams illustrating pressure distributions along flow paths of cooling air.

DESCRIPTION OF THE EMBODIMENTS

Figure 1:
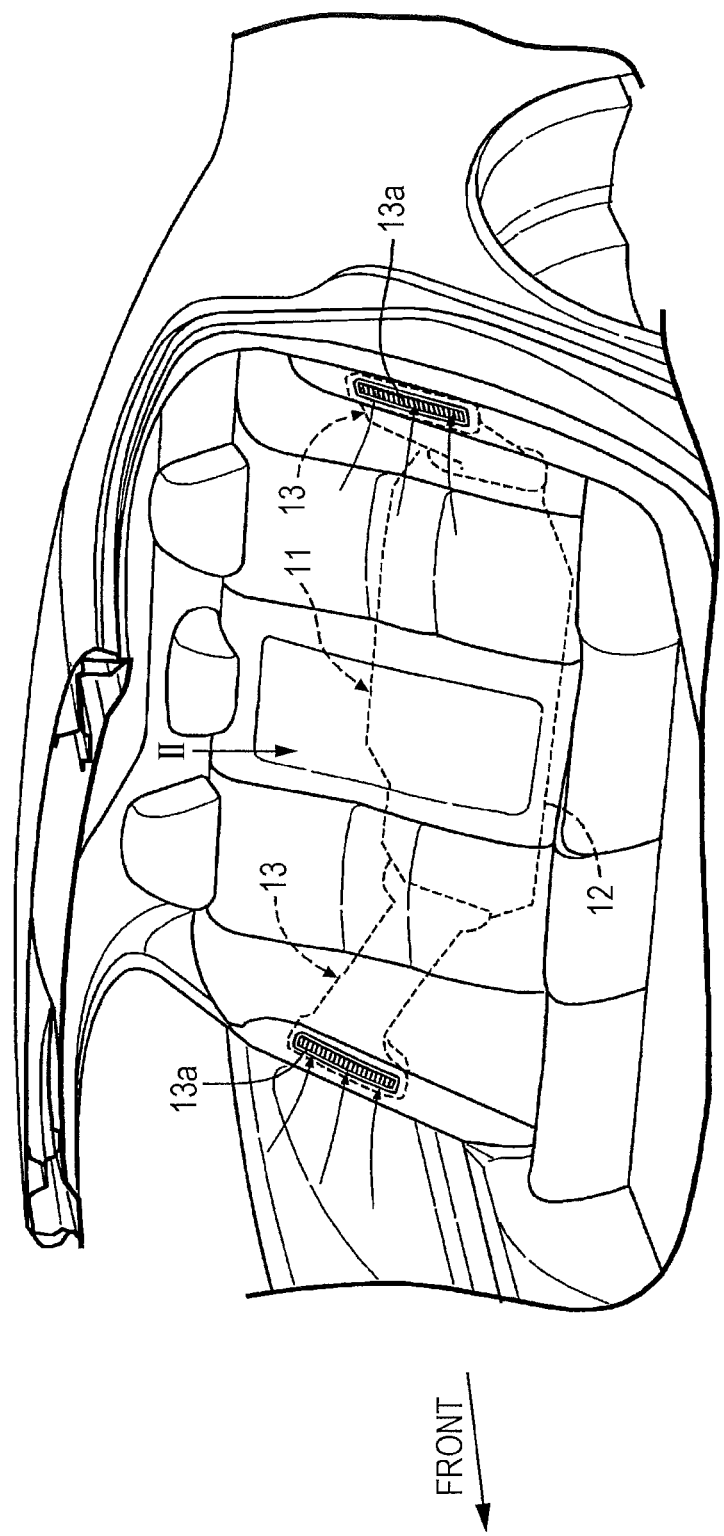
FIG. 1 is a perspective view of a rear portion of a vehicle cabin of an automobile.

The embodiments will now be described with reference to the accompanying drawings, wherein like reference numerals designate corresponding or identical elements throughout the various drawings.

An embodiment of the present disclosure will be described below with reference to FIG. 1 to FIG. 6.

Figure 2:
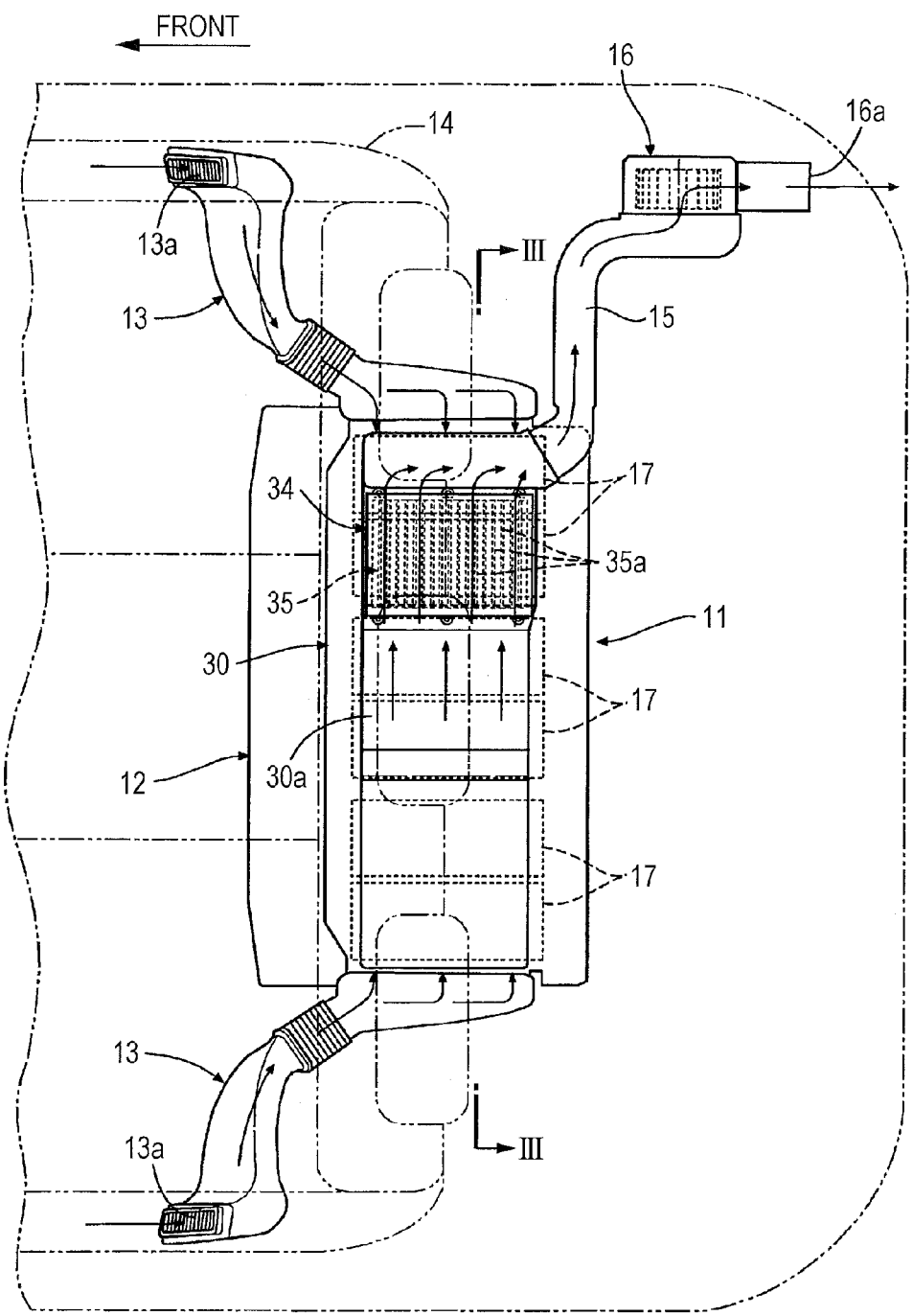
FIG. 2 is a view as seen in the direction of arrow II of FIG. 1.

As illustrated in FIG. 1 and FIG. 2, an electricity storage device 11 of a hybrid vehicle is mounted in a luggage compartment that is formed in a rear portion of a vehicle body. The electricity storage device 11 includes a box-shaped storage cell case 12. A pair of intake ducts 13 and 13 each of which extends forward from one of ends of the storage cell case 12 in a vehicle width direction, and intake ports 13a and 13a each of which is provided at an end of one of the intake ducts 13 and 13 are open to an area inside a vehicle cabin in opposite end portions of a rear seat 14 in the vehicle width direction. An exhaust duct 15 extends from the right side surface of the storage cell case 12 toward the outside in the vehicle width direction. An electric cooling fan 16 (a cooling air suction device) that is formed of a sirocco fan or the like is connected to an end of the exhaust duct 15, and an exhaust port 16a of the cooling fan 16 is open to the bottom surface of the luggage compartment. Six storage modules 17 are accommodated in the storage cell case 12.

Figure 5:
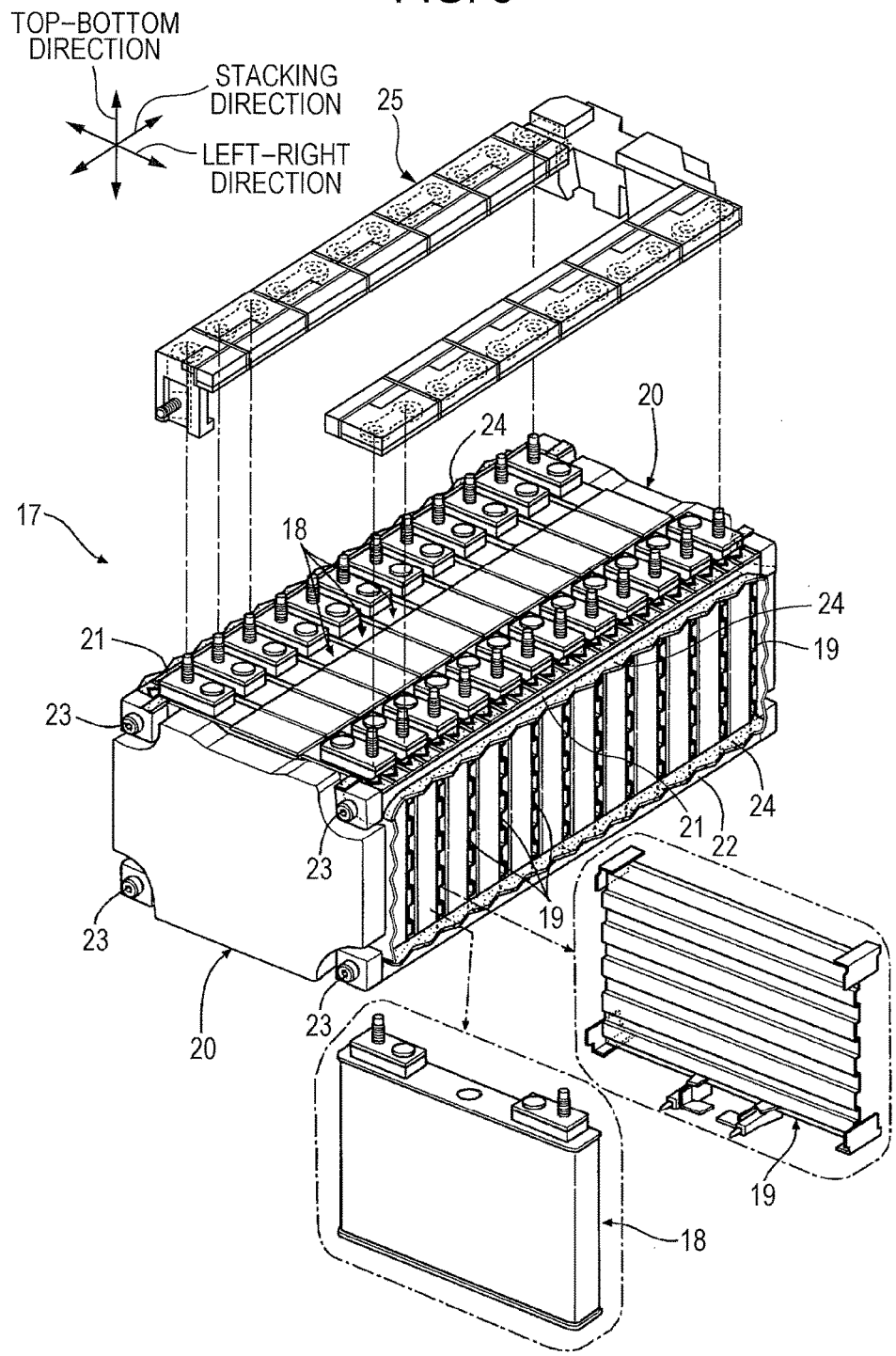
FIG. 5 is a perspective view of a storage module.

As illustrated in FIG. 5, in each of the storage modules 17, twelve storage cells 18 each of which is formed of a lithium-ion battery and thirteen storage cell holders 19 each of which is made of a synthetic resin and each of which has a square corrugated plate-like shape are alternately superposed with one another in a stacking direction, and a pair of metallic end plates 20 and 20 are each superposed on the outside of one of two storage cell holders 19 and 19 in the stacking direction, the two storage cell holders 19 and 19 being positioned at the opposite ends in the stacking direction. In a state where the storage cells 18, the storage cell holders 19, and the end plates 20 and 20 are stacked on top of one another in the stacking direction, upper restraint bands 21 and 21 that are formed of a pair of metallic bar-shaped members each of which is L-shaped in cross-section and lower restraint bands 22 and 22 that are formed of a pair of metallic bar-shaped members each of which is L-shaped in cross-section are fastened to four corners of the pair of end plates 20 and 20 with bolts 23 in order to assemble the storage modules 17.

In this state, insulators 24 and 24 each of which is made of a synthetic resin and used for preventing a liquid junction from occurring between the storage cells 18 and the restraint bands 21 and 21 due to dew condensation water are disposed between the storage cells 18 and the storage cell holders 19 and the restraint bands 21 and 21. Similarly, insulators 24 and 24 each of which is made of a synthetic resin and used for preventing a liquid junction from occurring between the storage cells 18 and the restraint bands 22 and 22 due to dew condensation water are disposed between the storage cells 18 and the storage cell holders 19 and the restraint bands 22 and 22. A storage cell bus bar 25 that is formed in a U-shape is mounted on top surfaces of the storage modules 17, and electrodes of the twelve storage cells 18 are electrically connected to one another in series by the storage cell bus bar 25.

The six storage modules 17, which are configured as described above, are arranged side-by-side in such a manner that the longitudinal direction (the stacking direction) of the storage modules 17 is parallel to a front-rear direction. In this state, in each of the storage modules 17, multiple cooling passages 26 that extend in a top-bottom direction of the vehicle are formed between the storage cell holders 19, each of which has a corrugated plate-like shape, and the storage cells 18 (see FIG. 3), and the storage cells 18 are cooled by cooling air that flows through the cooling passages 26.

Figure 3:
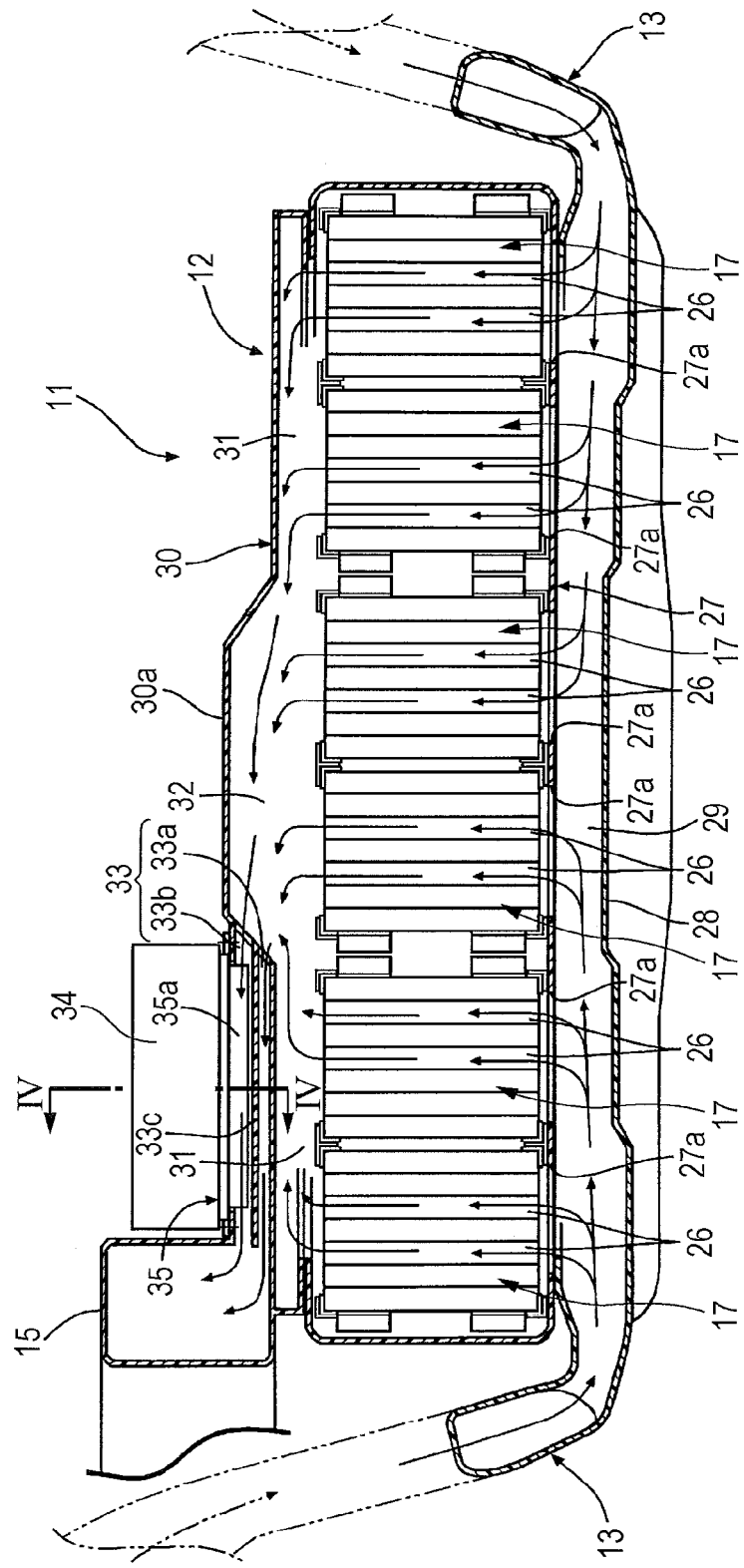
FIG. 3 is a sectional view taken along line III-III of FIG. 2.
Figure 4:
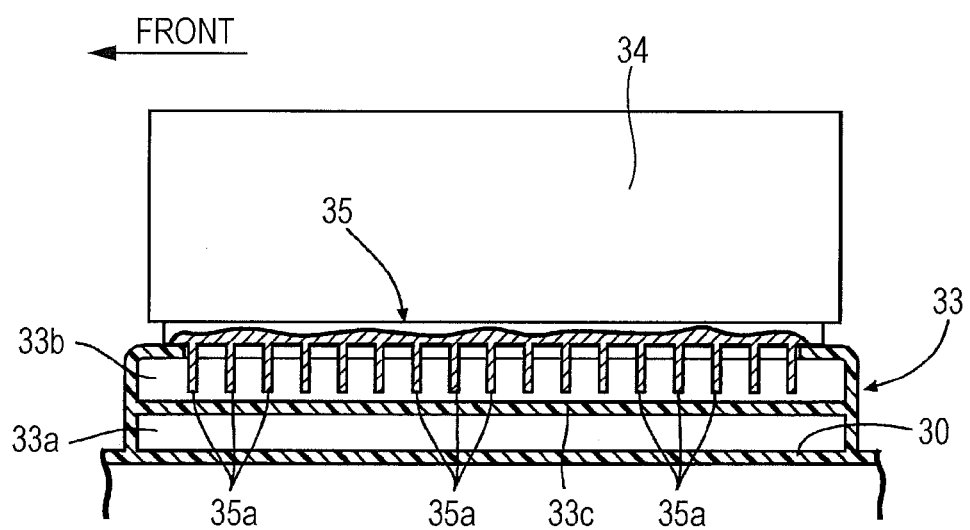
FIG. 4 is a sectional view taken along line IV-IV of FIG. 3.

As illustrated in FIG. 2 to FIG. 4, the storage cell case 12 includes a flat support wall 27 that supports the six storage modules 17, and a plurality of openings 27a through which cooling air may pass are formed in the support wall 27. The storage cell case 12 includes a bottom wall 28 opposite the support wall 27 below the support wall 27, and the intake ducts 13 and 13 are each connected to one of the left and right ends of an upstream-side passage 29 that is formed between a bottom surface of the support wall 27 and a top surface of the bottom wall 28 and that extends in the vehicle width direction. The height of the bottom wall 28 increases in a stepwise manner from the opposite ends toward the center in the vehicle width direction, and thus, the flow path cross-sectional area of the upstream-side passage 29 becomes progressively smaller from the upstream side (the sides of the opposite ends in the vehicle width direction) toward the downstream side (the side of the center in the vehicle width direction).

The storage cell case 12 includes a top wall 30 that covers upper portions of the storage modules 17, and a downstream-side passage 31 that extends in the vehicle width direction is formed between top surfaces of the storage modules 17 and a bottom surface of the top wall 30. A protruding portion 30a that projects upward is formed in a center portion of the top wall 30 in the vehicle width direction, and a cooling air chamber 32 that is in communication with a center portion of the downstream-side passage 31 in the vehicle width direction is formed in an area inside the protruding portion 30a.

A flow path resistance unit 33 (a flow path resistance) through which cooling air may pass extends from one side surface of the protruding portion 30a in the vehicle width direction to the outside in the vehicle width direction along a top surface of the top wall 30, and an upstream end of the exhaust duct 15 is connected to a downstream end of the flow path resistance unit 33. The flow path resistance unit 33 has a two-layer structure that has a lower passage 33a (a second flow path resistance) and an upper passage 33b (a first flow path resistance), and a partition plate 33c is interposed between the lower passage 33a and the upper passage 33b. The lower passage 33a is positioned below the partition plate 33c, and the upper passage 33b is superposed on the partition plate 33c. A DC-DC converter 34 (a heat generating member) for charging a car-mounted 12V battery (not illustrated) by stepping down the voltages of the storage modules 17 is supported above the upper passage 33b.

The DC-DC converter 34 is a heat generating member, and multiple cooling fins 35a that extend downward from a heat sink 35 that is connected to a bottom surface of the DC-DC converter 34 project into the upper passage 33b of the flow path resistance unit 33. The flow path cross-sectional area of the lower passage 33a is set in such a manner that the flow path resistance (a flow resistance value) of the lower passage 33a is smaller than the flow path resistance of the upper passage 33b.

Next, operation of the cooling structure of the electricity storage device that has the above-described configuration according to the embodiment of the present disclosure will be described.

There is a possibility that the storage cells 18, which are accommodated in the storage cell case 12 of the electricity storage device 11, will generate heat due to being charged and discharged and deteriorate, and thus, it is necessary to cool the storage cells 18 by using cooling air. When negative pressure is generated by driving the electric cooling fan 16, air in the vehicle cabin is drawn into the intake ducts 13 and 13 as cooling air from a pair of the intake ports 13a and 13a, and the air flows into the opposite end portions of the upstream-side passage 29, which is formed in a lower portion of the storage cell case 12, in the vehicle width direction from the intake ducts 13 and 13. Cooling air that flows in from one end portion of the upstream-side passage 29 and cooling air that flows in from the other end portion of the upstream-side passage 29 approach each other and branch upward in the flow progress, passes through the openings 27a of the support wall 27, and cools the storage modules 17, which are supported on the support wall 27. In other words, the multiple cooling passages 26, which extend in the top-bottom direction, are formed between the storage cell holders 19 and the storage cells 18 of each of the storage modules 17, and the cooling air, which passes through the cooling passages 26, comes into contact with side surfaces of the storage cells 18 and performs heat exchange, so that the storage cells 18 are cooled.

The cooling air that has passed through the cooling passages 26 flows into the downstream-side passage 31, which is formed in an upper portion of the storage cell case 12, and flows toward the center portion of the downstream-side passage 31 in the vehicle width direction in such a manner as to be collected in the cooling air chamber 32. After that, the cooling air is discharged from the exhaust port 16a to outside the luggage compartment via the lower passage 33a and the upper passage 33b of the flow path resistance unit 33, the exhaust duct 15, and the cooling fan 16. In this case, cooling air that cools the upper passage 33b of the flow path resistance unit 33 comes into contact with the cooling fins 35a of the heat sink 35, so that the DC-DC converter 34 that has generated heat is cooled via the heat sink 35.

Since the cooling air flows within the storage cell case 12 by the negative pressure, which is generated by the cooling fan 16, the internal pressure of the storage cell case 12 is lower than the atmospheric pressure. In this case, a pressure difference between the internal pressure of the storage cell case 12 and atmospheric pressure becomes large, there is a possibility of air in the luggage compartment being drawn in from a gap in a connecting portion of the storage cell case 12 and of the air becoming mixed into the cooling air that is introduced from the vehicle cabin. In particular, in the case of high temperature such as during the summer season, the temperature of the air in the luggage compartment and the temperature of the outside air are much higher than the temperature of the air in the vehicle cabin that is air-conditioned, and thus, in the case where the high-temperature air is mixed into the cooling air, the cooling performances of some of the storage cells 18 decreases, and there may be variations in the temperatures of the individual storage cells 18, resulting in deterioration of durability of the storage cells 18. For these reasons, it is desirable that a reduction in the internal pressure of the storage cell case 12, particularly, a reduction in the internal pressures of the cooling passages 26 be suppressed and that a pressure difference between the internal pressures and the atmospheric pressure be reduced to a minimum value.

FIGS. 6A and 6B illustrate pressure distributions along flow paths of cooling air from the intake ducts 13 and 13 to the exhaust duct 15. FIG. 6A corresponds to the embodiment, and FIG. 6B corresponds to a comparative example.

In the comparative example illustrated in FIG. 6B, the flow path resistance unit 33, which is disposed between the cooling passages 26 and the cooling fan 16 in the embodiment, is disposed between the intake ducts 13 and 13 and the cooling passages 26. The cooling air flow path cross-sectional areas of the intake ducts 13 and 13 and the exhaust duct 15 are relatively large, and thus, the flow path resistances of the intake ducts 13 and 13 and the exhaust duct 15 are relatively small. The cooling air flow path cross-sectional areas of the cooling passages 26 are relatively small, and thus, the flow path resistances of the cooling passages 26 are relatively large. The cooling air flow path cross-sectional area of the flow path resistance unit 33 is small, and thus, the flow path resistance of the flow path resistance unit 33 is large.

Therefore, the pressure of the cooling air in the vehicle cabin that is at atmospheric pressure slightly decreases during the period when the cooling air is passing through the intake ducts 13 and 13, significantly decreases during the period when the cooling air is subsequently passing through the flow path resistance unit 33, somewhat significantly decreases during the period when the cooling air is subsequently passing through the cooling passages 26, and slightly decreases during the period when the cooling air is subsequently passing through the exhaust duct 15. After that, the cooling air passes through the cooling fan 16, and the pressure of the cooling air returns to the atmospheric pressure. As a result, a pressure difference between the internal pressure of the cooling passages 26 in which the cooling air comes into contact with the storage cells 18 and the atmospheric pressure becomes large, and there is a possibility of a large amount of high-temperature air in the luggage compartment being drawn into the cooling passages 26.

On the other hand, in the embodiment illustrated in FIG. 6A, the flow path resistance unit 33 is disposed between the cooling passages 26 and the exhaust duct 15, and thus, the pressure of the cooling air in the vehicle cabin that is at atmospheric pressure slightly decreases during the period when the cooling air is passing through the intake ducts 13 and 13, somewhat significantly decreases during the period when the cooling air is subsequently passing through the cooling passages 26, significantly decreases during the period when the cooling air is subsequently passing through the flow path resistance unit 33, and slightly decreases during the period when the cooling air is subsequently passing through the exhaust duct 15. After that, the cooling air passes through the cooling fan 16, and the pressure of the cooling air returns to the atmospheric pressure. As a result, a pressure difference between the internal pressure of the cooling passages 26 in which the cooling air comes into contact with the storage cells 18 and the atmospheric pressure becomes significantly smaller compared with that of the comparative example of FIG. 6B, and a large amount of high-temperature air in the luggage compartment may be prevented from being drawn into the cooling passages 26.

Note that, in the present embodiment, in the case where the flow rate of cooling air is 120 m$^3$ per hour, the pressure loss (the flow path resistance) in each cooling air flow path is as follows.

Intake duct 13: 30 Pa
Upstream-side passage 29: 17 Pa
Cooling passage 26: 60 Pa
Downstream-side passage 31+cooling air chamber 32: 50 Pa
Flow path resistance unit 33: 130 Pa (Upper passage: 110 Pa+lower passage: 20 Pa)
Exhaust duct 15: 30 Pa As described above, according to the present disclosure, the flow path resistance unit 33 in which the flow path resistance of cooling air is large is disposed downstream of the cooling passages 26, so that a decrease in the internal pressures of the cooling passages 26 may be suppressed, and as a result, a decrease in the cooling performances of the storage cells 18 may be prevented. In addition, since the cooling air chamber 32 in which cooling air temporarily accumulates is disposed between the cooling passages 26 and the exhaust duct 15, the internal pressure of the storage cell case 12 is further not likely to be decreased by the cushioning effect of the cooling air chamber 32, and the outside warm air may be prevented from being drawn in from a gap in the storage cell case 12 with more certainty.

In addition, since the pair of intake ducts 13 and 13 are disposed on the left and right sides of the storage cell case 12, the flow path resistance of cooling air is reduced, and a decrease in the internal pressure of the storage cell case 12 may be more effectively suppressed as compared with the case where only one intake duct 13 is disposed.

The storage cell case 12 includes the upstream-side passage 29 that is positioned upstream of the plurality of cooling passages 26 and the downstream-side passage 31 that is positioned downstream of the plurality of cooling passages 26, and the pair of intake ducts 13 and 13 are connected to both the ends of the upstream-side passage 29, and thus, the cooling air may be drawn in from both the ends of the upstream-side passage 29 and may be uniformly supplied to the plurality of cooling passages 26. In this case, if the flow path cross-sectional area of the upstream-side passage 29 is constant in the vehicle width direction, the flow rate of the cooling air that branches from the vicinity of both the end portions of the upstream-side passage 29, which is connected to the intake ducts 13 and 13, in the vehicle width direction to the cooling passages 26 decreases, and the flow rate of the cooling air that branches from the vicinity of a center portion of the upstream-side passage 29 in the vehicle width direction in which cooling air that has flowed out from one direction and cooling air that has flowed out from the other direction opposite to the one direction hit each other to the cooling passages 26 increases. Thus, there is a possibility of unevenness in cooling performance occurring between inner portions and outer portions of the storage cells 18 in the vehicle width direction. However, according to the present disclosure, the flow path cross-sectional area of the upstream-side passage 29 is set to become progressively smaller from the upstream side (the sides of both the ends in the vehicle width direction) toward the downstream side (the side of the center in the vehicle width direction), and thus, the cooling air may be made to uniformly branch from the entire upstream-side passage 29 in the vehicle width direction to the cooling passages 26 and to uniformly come into contact with all of the storage cells 18.

Since the cooling air chamber 32 is connected to the center portion of the downstream-side passage 31 in the vehicle width direction, the cooling air that has flowed out from the plurality of cooling passages 26 may be uniformly discharged to the cooling air chamber 32 via the downstream-side passage 31, and unevenness in temperature between a plurality of the storage cells 18 may be prevented.

The flow path resistance unit 33 is formed of the upper passage 33b in which the cooling fins 35a of the heat sink 35 that cool the DC-DC converter 34 are disposed and the lower passage 33a that bypasses the upper passage 33b, and the flow path resistance of the lower passage 33a is smaller than the flow path resistance of the upper passage 33b. Thus, the flow rate of the cooling air that flows through the cooling passages 26 may be secured by preventing the flow path resistance of the upper passage 33b in which the cooling fins 35a are disposed from becoming excessive. In addition, the lower passage 33a and the upper passage 33b of the flow path resistance unit 33 are partitioned by the partition plate 33c, and this facilitates setting of the flow path resistance of the lower passage 33a and the flow path resistance of the upper passage 33b.

Note that although the temperature of the cooling air that flows through the upper passage 33b in which the cooling fins 35a are disposed, has been increased by heat exchange with the storage cells 18 in the cooling passages 26, since the DC-DC converter 34 is a member having a temperature much higher than that of the storage cells 18, the cooling air having a temperature that has been increased after the cooing air has passed through the cooling passages 26 may provide a sufficient cooling performance.

Since a relationship of the flow path resistance of each of the intake ducts 13 and 13 (30 Pa)<the flow path resistance of each of the cooling passages 26 (60 Pa)<the flow path resistance of the flow path resistance unit 33 (130 Pa) is set, the flow path resistance on the upstream side of the cooling passages 26 may be small, and cooling air may be easily introduced into the cooling passages 26. As a result, the internal pressure of each of the cooling passages 26 may be more effectively prevented from being decreased. Similarly, since a relationship of the flow path resistance of the upstream-side passage 29 (17 Pa)<the flow path resistance of each of the cooling passages 26 (60 Pa)<the flow path resistance of the flow path resistance unit 33 (130 Pa) is satisfied, the flow path resistance on the upstream side of the cooling passages 26 may be small, and cooling air may be easily introduced into the cooling passages 26. As a result, the internal pressure of each of the cooling passages 26 may be more effectively prevented from being decreased.

Although the embodiment of the present disclosure has been described above, various design changes may be made within the scope of the present disclosure.

For example, the storage cells 18 of the embodiment are not limited to lithium-ion batteries and may be other types of batteries or capacitors.

The heat generating member of the present disclosure is not limited to the DC-DC converter 34 of the embodiment and may be one of other heat generating members such as an inverter.

The cooling air suction device of the present disclosure is not limited to the cooling fan 16 (the sirocco fan) of the embodiment and may be one of other types of fans or a negative pressure pump.

The position at which the electricity storage device 11 of the present disclosure is to be mounted is not necessarily be in the luggage compartment.

In the embodiment, the lower passage 33a and the upper passage 33b of the flow path resistance unit 33 are partitioned by the partition plate 33c. However, the partition plate 33c is not essential as long as a space that is unreachable by the cooling fins 35a of the heat sink 35 is formed in the flow path resistance unit 33.

The structure of the flow path resistance unit 33 may be any structure as long as the flow path resistance unit 33 obstructs the flow of cooling air, and the flow of cooling air may be partly obstructed by, for example, simply forming a wall.

A cooling structure of an electricity storage device according to the embodiments includes a storage cell case, a plurality of storage cells that are accommodated in the storage cell case, a plurality of cooling passages that are formed between the storage cells, which are adjacent to one another, an intake duct that is connected to an upstream side of the storage cell case, an exhaust duct that is connected to a downstream side of the storage cell case, and a cooling air suction device that is connected to the exhaust duct and that causes cooling air to be drawn into the intake duct. A flow path resistance unit that partly interrupts cooling air between the intake duct and the cooling air suction device is disposed between the cooling passages and the cooling air suction device.

According to the cooling structure of the embodiments, an electricity storage device includes the storage cell case, the plurality of storage cells that are accommodated in the storage cell case, the plurality of cooling passages that are formed in parallel between the storage cells, which are adjacent to one another, the intake duct that is connected to an upstream side of the storage cell case, the exhaust duct that is connected to a downstream side of the storage cell case, and the cooling air suction device that is connected to the exhaust duct and that causes cooling air to be drawn into the intake duct. Since the flow path resistance unit, which partly interrupts cooling air between the intake duct and the cooling air suction device, is disposed between the cooling passages and the cooling air suction device, even if a large negative pressure is generated downstream of the flow path resistance unit as a result of drawing in cooling air by the cooling air suction device, the negative pressure is not likely to be applied to the cooling passages on the upstream side of the flow path resistance unit, and the cooling performances of the storage cells may be prevented from being decreased due to the outside warm air that is drawn into the cooling passages from the gap in the storage cell case.

In the cooling structure of an electricity storage device according to the embodiments, a cooling air chamber in which cooling air temporarily accumulates may be disposed between the cooling passages and the flow path resistance unit.

According to the cooling structure of the embodiments, the cooling air chamber in which cooling air temporarily accumulates is disposed between the cooling passages and the flow path resistance unit, and thus, the internal pressures of the cooling passages are further not likely to be decreased by the cushioning effect of the cooling air chamber, and the outside warm air may be prevented from being drawn in from the gap in the storage cell case with more certainty.

In the cooling structure of an electricity storage device according to the embodiments, a plurality of the intake ducts may be provided.

According to the cooling structure of the embodiments, the plurality of intake ducts are provided, and thus, a reduction in the internal pressures of the cooling passages may be more effectively suppressed by reducing the flow path resistance of the intake ducts.

In the cooling structure of an electricity storage device according to the embodiments, the storage cell case may include an upstream-side passage that is positioned upstream of the plurality of cooling passages and a downstream-side passage that is positioned downstream of the plurality of cooling passages, a pair of the intake ducts may be connected to opposite ends of the upstream-side passage, and the cooling air chamber may be connected at the center of the downstream-side passage.

According to the cooling structure of the embodiments, the storage cell case includes the upstream-side passage, which is positioned upstream of the plurality of cooling passages, and the downstream-side passage, which is positioned downstream of the plurality of cooling passages, the pair of the intake ducts are connected to opposite ends of the upstream-side passage, and the cooling air chamber is connected at the center of the downstream-side passage. Thus, cooling air may be drawn from both the ends of the upstream-side passage and may be uniformly supplied to the plurality of cooling passages. In addition, cooling air may be uniformly discharged to the cooling air chamber from the plurality of cooling passages via the downstream-side passage, and as a result, unevenness in temperature between the plurality of storage cells may be prevented.

In the cooling structure of an electricity storage device according to the embodiments, the flow path resistance unit may be formed of a first flow path resistance unit in which a heat sink that cools a heat generating member is disposed and a second flow path resistance unit that bypasses the first flow path resistance unit, and a flow path resistance of the second flow path resistance unit may be smaller than a flow path resistance of the first flow path resistance unit.

According to the cooling structure of the embodiments, the flow path resistance unit is formed of the first flow path resistance unit in which the heat sink, which cools the heat generating member, is disposed and the second flow path resistance unit, which bypasses the first flow path resistance unit, and a flow path resistance of the second flow path resistance unit is smaller than a flow path resistance of the first flow path resistance unit. Thus, the flow path resistance of the first flow path resistance unit in which the heat sink is disposed may be prevented from becoming excessive, and the flow rate of the cooling air that flows through the cooling passages may be secured.

In the cooling structure of an electricity storage device according to the embodiments, the first flow path resistance unit and the second flow path resistance unit may be partitioned.

According to the cooling structure of the embodiments, the first flow path resistance unit and the second flow path resistance unit are partitioned, and this facilitates setting of the flow path resistance of the first flow path resistance unit and the flow path resistance of the second flow path resistance unit.

In the cooling structure of an electricity storage device according to the embodiments, a relationship of a flow path resistance of the intake duct<a flow path resistance of one of the cooling passages<a flow path resistance of the flow path resistance unit may be satisfied with respect to flow path resistances of flow paths.

According to the cooling structure of the embodiments, the relationship of a flow path resistance of the intake duct<a flow path resistance of one of the cooling passages<a flow path resistance of the flow path resistance unit is satisfied with respect to flow path resistances of the flow paths, and thus, the flow path resistance on the upstream side of the cooling passages may be small, and cooling air may be easily introduced into the cooling passages, so that the internal pressure of each of the cooling passages may be more effectively prevented from being decreased.

In the cooling structure of an electricity storage device according to the embodiments, an upstream-side passage may be disposed between the cooling passages and the intake duct, and a relationship of a flow path resistance of the upstream-side passage<a flow path resistance of one of the cooling passages<a flow path resistance of the flow path resistance unit may be satisfied with respect to flow path resistances of flow paths.

According to the cooling structure of the embodiments, the upstream-side passage is disposed between the cooling passages and the intake duct, and the relationship of a flow path resistance of the upstream-side passage<a flow path resistance of one of the cooling passages<a flow path resistance of the flow path resistance unit is satisfied with respect to flow path resistances of the flow paths. Thus, the flow path resistance on the upstream side of the cooling passages may be small, and cooling air may be easily introduced into the cooling passages, so that the internal pressure of each of the cooling passages may be more effectively prevented from being decreased.

Obviously, numerous modifications and variations of the present invention are possible in light of the above teachings. It is therefore to be understood that within the scope of the appended claims, the invention may be practiced otherwise than as specifically described herein.

What is claimed is:

1. A cooling structure of an electricity storage device, comprising:
   a storage cell case;
   a plurality of storage cells disposed adjacent to a plurality of respective storage cell holders and accommodated in the storage cell case;
   a plurality of cooling passages provided between the storage cells, each of the plurality of cooling passages having an inlet and an outlet which are disposed between corresponding ends of adjacent storage cells;
   an intake duct connected to an upstream side of the storage cell case;
   an exhaust duct connected to a downstream side of the storage cell case;
   a cooling air suction device connected to the exhaust duct and configured to draw cooling air from the intake duct; and
   a flow path resistance unit extending directly from a wall of the downstream side of the storage cell case, the flow path resistance unit extending in an extending direction that is parallel to a stacking direction of the plurality of storage cells such that cooling air flows in a direction orthogonal to the stacking direction through the plurality of cooling passages and subsequently flows along the extending direction through the flow path resistance unit, the flow path resistance unit provided between the outlets of the plurality of cooling passages and the cooling air suction device to limit a flow of the cooling air from the intake duct to the cooling air suction device,
   wherein the storage cell case includes a downstream-side passage disposed between the outlets of the plurality of cooling passages and the flow path resistance unit, and a cooling air chamber in which cooling air temporarily accumulates extending from the downstream-side passage, and
   wherein the flow path resistance unit includes a first passage and a second passage that each receive a separate flow of cooling air from the cooling air chamber in order to partly obstruct the flow of the cooling air.

2. The cooling structure of an electricity storage device according to claim 1,
   wherein the cooling air chamber is disposed between the outlets of the cooling passages and the flow path resistance unit.

3. The cooling structure of an electricity storage device according to claim 1,
   wherein a plurality of the intake ducts are provided.

4. The cooling structure of an electricity storage device according to claim 3, wherein the storage cell case includes an upstream-side passage that is positioned upstream of the plurality of cooling passages and the downstream-side passage is positioned downstream of the plurality of cooling passages, wherein a pair of the intake ducts are connected to opposite ends of the upstream-side passage, and wherein the cooling air chamber is connected at a center of the downstream-side passage.

5. The cooling structure of an electricity storage device according to claim 1, wherein a heat sink that cools a heat generating member is disposed in the first passage, and the second passage bypasses the first passage such that the separate flow of cooling air in the second passage bypasses the heat sink, and wherein a flow resistance value of the second passage is smaller than a flow resistance value of the first flow path resistance unit, the flow resistance value of the first flow path resistance unit and the flow resistance value of the second flow path resistance unit being determined by respective cross-sectional areas of the first flow path resistance unit and the second flow path resistance unit.

6. The cooling structure of an electricity storage device according to claim 5, wherein the first passage and the second passage are partitioned.

7. The cooling structure of an electricity storage device according to claim 1, wherein a flow resistance value of the intake duct is smaller than a flow resistance value of one of the cooling passages which is smaller than a flow resistance value of the flow path resistance unit, the flow resistance value of the intake duct, the flow resistance value of the one of the cooling passages, and the flow resistance value of the flow path resistance unit being determined by respective cross-sectional areas of the intake duct, the one of the cooling passages, and the flow path resistance unit.

8. The cooling structure of an electricity storage device according to claim 1, wherein an upstream-side passage is disposed between the cooling passages and the intake duct, and wherein a flow resistance value of the upstream-side passage is smaller than a flow resistance value of one of the cooling passages which is smaller than a flow resistance value of the flow path resistance unit, the flow resistance value of the upstream-side passage, the flow resistance value of the one of the cooling passages, and the flow resistance value of the flow path resistance unit being determined by respective cross-sectional areas of the upstream-side passage, the one of the cooling passages, and the flow path resistance unit.

9. The cooling structure of an electricity storage device according to claim 1, wherein the flow path resistance unit receives the flow of cooling air after the cooling air passes the plurality of storage cells.

10. The cooling structure of an electricity storage device according to claim 1, wherein the first and second passages are separated by a partition wall.

11. The cooling structure of an electricity storage device according to claim 10, wherein the cooling air chamber is disposed at a center of the downstream-side passage, and wherein the downstream-side passage is disposed downstream of the outlets of the plurality of cooling passage, and the first passage and the second passage are positioned downstream of the cooling air chamber.

12. The cooling structure of an electricity storage device according to claim 1, further comprising an upstream-side passage that is positioned between the plurality of storage cells and a wall of the upstream side of the storage cell case, wherein the downstream-side passage is positioned between the plurality of storage cells and the wall of the downstream side of the storage cell case, and wherein the flow path resistance unit is disposed downstream of the upstream-side passage and the downstream-side passage when cooling air flows from the intake duct toward the exhaust duct.

13. The cooling structure of an electricity storage device according to claim 1, further comprising a heat sink having a plurality of fins that extend inside the flow path resistance unit.

14. The cooling structure of an electricity storage device according to claim 1, wherein the flow of cooling air in the first passage of the flow path resistance unit is independent from the flow of cooling air in the second passage of the flow path resistance unit.

15. The cooling structure of an electricity storage device according to claim 1, wherein a direction of the flow of cooling air in the first passage is substantially the same as a direction of the flow of cooling air in the second passage.

16. The cooling structure of an electricity storage device according to claim 1, wherein the second passage bypasses the first passage.

17. The cooling structure of an electricity storage device according to claim 1, wherein the cooling air chamber extends directly from the downstream-side passage and is disposed between the downstream-side passage and the flow path resistance unit.

18. The cooling structure of an electricity storage device according to claim 1, wherein the cooling air flows directly to the first passage from the cooling air chamber and directly to the second passage from the cooling air chamber.

19. The cooling structure according to claim 1, wherein a cross-sectional area of the first passage is smaller than a cross sectional area of the cooling air chamber and a cross-sectional area of the second passage is smaller than the cross sectional area of the cooling air chamber.

20. The cooling structure of an electricity storage device according to claim 1, wherein separate flows of cooling air in the first passage and the second passage rejoin and flow together through the exhaust duct due to the cooling air suction device.

21. A cooling structure of an electricity storage device, comprising:

a storage cell case;

a plurality of storage cells disposed adjacent to a plurality of respective storage cell holders and accommodated in the storage cell case;

a plurality of cooling passages provided between the storage cells, each of the plurality of cooling passages having an inlet and an outlet which are disposed between corresponding ends of adjacent storage cells;

an intake duct connected to an upstream side of the storage cell case;

an exhaust duct connected to a downstream side of the storage cell case;

a cooling air suction device connected to the exhaust duct and configured to draw cooling air from the intake duct; and a flow path resistance unit extending directly from a wall of the downstream side of the storage cell case, the flow path resistance unit extending in an extending direction that is parallel to a stacking direction of the plurality of storage cells and being provided between the outlets of the plurality of cooling passages and the cooling air suction device to limit a flow of the cooling air from the intake duct to the cooling air suction device, wherein the storage cell case includes a downstream-side passage disposed between the outlets of the plurality of cooling passages and the flow path resistance unit, and a cooling air chamber in which cooling air temporarily accumulates extending from the downstream-side passage, wherein the flow path resistance unit includes a first passage and a second passage that each receive a separate flow of cooling air from the cooling air chamber in order to partly obstruct the flow of the cooling air, and wherein a heat sink that cools a heat generating member is disposed in the first passage, and the second passage bypasses the first passage such that the separate flow of air in the second passage bypasses the heat sink.

22. The cooling structure of an electricity storage device according to claim 21, wherein separate flows of cooling air in the first passage and the second passage rejoin and flow together through the exhaust duct due to the cooling air suction device.

23. The cooling structure of an electricity storage device according to claim 21, further comprising a partition between the first passage and the second passage to bypass the flow of air in the second passage from the heat sink.

24. The cooling structure of an electricity storage device according to claim 1,
wherein the cooling air chamber is connected at a center of the downstream-side passage so as to overlap the flow path resistance unit in the extending direction.

25. The cooling structure of an electricity storage device according to claim 21,
wherein the cooling air chamber is connected at a center of the downstream-side passage so as to overlap the flow path resistance unit in the extending direction.

* * * * *